United States Patent
Plante et al.

(10) Patent No.: US 9,399,315 B2
(45) Date of Patent: Jul. 26, 2016

(54) DEVICE FOR MANUFACTURING A CASING MADE OF A COMPOSITE MATERIAL AND MANUFACTURING METHOD USING SUCH A DEVICE

(75) Inventors: Romain Plante, Avon (FR); Jean-Pierre Cauchois, Saint-Avold (FR); Louis Bettega, Boucheporn (FR); Jean-Louis Robert Marcel Castanie, Saint Maur des Fosses (FR)

(73) Assignee: SNECMA, Paris (FR)

( * ) Notice: Subject to any disclaimer, the term of this patent is extended or adjusted under 35 U.S.C. 154(b) by 569 days.

(21) Appl. No.: 13/641,974

(22) PCT Filed: Apr. 20, 2011

(86) PCT No.: PCT/FR2011/050908
§ 371 (c)(1),
(2), (4) Date: Dec. 20, 2012

(87) PCT Pub. No.: WO2011/131908
PCT Pub. Date: Oct. 27, 2011

(65) Prior Publication Data
US 2013/0087955 A1    Apr. 11, 2013

(30) Foreign Application Priority Data
Apr. 20, 2010    (FR) ...................................... 10 52999

(51) Int. Cl.
*B29C 70/48*    (2006.01)
*B29C 45/00*    (2006.01)
(Continued)

(52) U.S. Cl.
CPC ............. *B29C 45/0005* (2013.01); *B29C 33/38* (2013.01); *B29C 70/462* (2013.01);
(Continued)

(58) Field of Classification Search
CPC .. B29C 45/0005; B29C 70/462; B29C 70/48; B29C 33/42; B29C 33/76; B29C 70/36; B29C 70/34
See application file for complete search history.

(56) References Cited

U.S. PATENT DOCUMENTS

| 1,001,500 | A | * | 8/1911 | Blayney | .......................... 249/177 |
| 3,165,569 | A | * | 1/1965 | Bright | ............................ 264/313 |

(Continued)

FOREIGN PATENT DOCUMENTS

| EP | 0 491 649 A2 | 6/1992 |
| EP | 1 000 725 A1 | 5/2000 |

(Continued)

OTHER PUBLICATIONS

Thermal Expansion, http://en.wikipedia.org/wiki/Thermal_expansion, downloaded Jan. 30, 2015, 14 pages.*

(Continued)

*Primary Examiner* — Matthew Daniels
(74) *Attorney, Agent, or Firm* — Oblon, McClelland, Maier & Neustadt, L.L.P.

(57) ABSTRACT

A device for manufacturing a fan casing of a turbomachine made of composite material, in which a mold includes a cylindrical body of lengthways axis and side flanges, and in which a counter-mold includes a cylindrical body and side counter-flanges. The counter-flanges are configured to be attached securely to the flanges, the body of the mold and the body of the counter-mold are concentric, the preform is configured to be positioned between the body of the mold and the body of the counter-mold, and the material of the body of the mold has an appreciably higher expansion coefficient than that of the body of the counter-mold.

14 Claims, 4 Drawing Sheets

Figure 1:
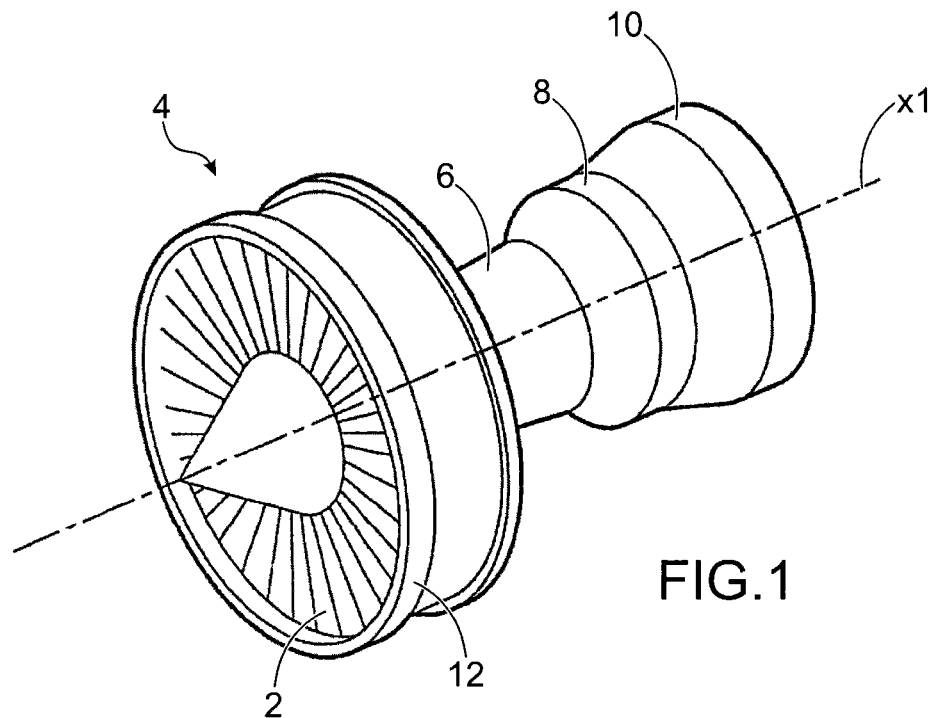

(51) Int. Cl.
*B29C 33/38* (2006.01)
*B29C 70/46* (2006.01)
*B29C 70/54* (2006.01)
*F01D 21/04* (2006.01)
*F02C 7/04* (2006.01)
*B29K 105/00* (2006.01)
*B29L 23/00* (2006.01)
*B29L 31/00* (2006.01)

(52) U.S. Cl.
CPC ............. *B29C 70/48* (2013.01); *B29C 70/54* (2013.01); *F01D 21/045* (2013.01); *F02C 7/04* (2013.01); *B29C 33/3828* (2013.01); *B29K 2105/258* (2013.01); *B29L 2023/00* (2013.01); *B29L 2031/7504* (2013.01); *F05D 2300/603* (2013.01); *Y02T 50/672* (2013.01)

(56) References Cited

U.S. PATENT DOCUMENTS

| | | | |
|---|---|---|---|
| 4,448,628 A * | 5/1984 | Stott | 156/425 |
| 4,717,330 A * | 1/1988 | Sarh | 425/403 |
| 5,022,845 A * | 6/1991 | Charlson et al. | 425/403 |
| 5,084,219 A * | 1/1992 | Sigur | 264/487 |
| 5,190,773 A * | 3/1993 | Damon | 425/186 |
| 5,204,042 A * | 4/1993 | James et al. | 264/257 |
| 5,431,870 A * | 7/1995 | Andre | 264/103 |
| 5,597,435 A | 1/1997 | Desautels et al. | |
| 5,863,452 A | 1/1999 | Harshberger, Jr. et al. | |
| 6,174,484 B1 * | 1/2001 | Thompson et al. | 264/314 |
| 2006/0134251 A1 | 6/2006 | Blanton et al. | |
| 2006/0186580 A1 | 8/2006 | Otten et al. | |
| 2007/0012858 A1 * | 1/2007 | Callis | 249/134 |
| 2008/0206048 A1 | 8/2008 | Coupe et al. | |
| 2009/0098337 A1 * | 4/2009 | Xie et al. | 428/121 |
| 2013/0087955 A1 | 4/2013 | Plante et al. | |
| 2014/0083548 A1 | 3/2014 | Plante et al. | |

FOREIGN PATENT DOCUMENTS

| | | |
|---|---|---|
| EP | 1 961 923 A2 | 8/2008 |
| FR | 2 613 662 A2 | 10/1988 |
| FR | 2 879 497 A1 | 6/2006 |
| GB | 1050562 | 12/1966 |
| JP | 2005-193587 A | 7/2005 |
| JP | 2009-107337 A | 5/2009 |
| WO | WO 02/02298 A1 | 1/2002 |

OTHER PUBLICATIONS

French Preliminary Search Report issued Dec. 10, 2010 in Patent Application No. 1052999 with English Translation of Category of Cited Documents.

International Search Report issued Aug. 29, 2011 in PCT/FR2011/050908.

Leslie A. Hoeckelman, "Environmental Protection and Sealing", In: D. B. Miracle & S. L. Donaldson : "Composites", vol. 21, XP-002655803, Dec. 2001, pp. 659-665.

Japanese Office Action issued Dec. 16, 2014 in Patent Application No. 2013-5055269 (with English Translation).

* cited by examiner

DEVICE FOR MANUFACTURING A CASING MADE OF A COMPOSITE MATERIAL AND MANUFACTURING METHOD USING SUCH A DEVICE

TECHNICAL FIELD AND PRIOR ART

The present invention relates to a device for manufacturing objects made of a composite material, in particular objects having high mechanical and dimensioning requirements, for example turbomachine casings, such as fan casings. The present invention also relates to a method for manufacturing objects made of composite material using such a device.

Conventionally a turbojet comprises, moving from upstream to downstream, a low-pressure compressor, or fan, a high-pressure compressor, a combustion chamber, a high-pressure turbine and a low-pressure turbine.

In addition, the turbojet comprises an external casing or fan casing, an internal casing and an intermediate casing concentric to the first two casings and dividing the space delimited between the external and internal casings into a primary air path used for compression and subsequently for expansion of the propellant gases, and a secondary air path in which the dilution air flows.

The fan casing has several functions. In particular it defines the air inlet duct in the engine. Another of its functions is to form a containment casing forming a debris trap holding debris, such as aspired objects or fragments of damaged blades projected by centrifugation, in order that they do not reach other portions of the aircraft.

It is generally sought to reduce the mass of the turbojet, and to this end to reduce the mass of the various elements comprising it. One of the solutions to attain this result is to manufacture the parts from the material of lower density.

The fan casing is made of aluminium alloy; it is then lighter than a steel fan casing.

However it is sought to reduce its mass further. Composite materials are an interesting option. Indeed, the parts which can be manufactured from a composite material are those which are not exposed to excessively high temperatures, which is the case of the fan casing, since the temperature to which it may be subjected is of the order of −50° C. to a maximum of 120° C. Fan casings or containment casings made of composite material are known in the state of the art, for example from document EP 1 961 923. The fan casing is made from a fibrous preform by three-dimensional weaving around a mandrel. During manufacture the preform is covered with a flexible case which with the mandrel defines a sealed space. A vacuum pressure is established between this sealed space and a resin is introduced into the space; impregnation is then facilitated by the vacuum pressure. A step of polymerisation of the resin then takes place.

A blank is then directly obtained enabling the casing to be obtained after machining.

This method is called the "method by infusion". It has the advantage that it requires relatively lightweight equipment. However, the time required to manufacture a part is relatively long. In addition, it is ineffective in eliminating the faults of the preform if the woven fibres swell, and cannot guarantee the geometry of the part.

There is another method by injection of liquid resin, called RTM (Resin Transfer Moulding), which consists in placing the preform between a rigid mould and a rigid counter-mould, and securely attaching them to one another. The space delimited in this manner has the final dimensions of the object to be manufactured, and the resin is injected under pressure. The injection pressure may be as high as 15 bar.

This method has the advantage that it has a relatively short cycle period. In addition, due to the use of a rigid counter-mould, the swelling may be controlled. Conversely, it requires the use of "heavyweight" equipment, and difficult handling, particularly in the case of parts of large dimensions, since it must withstand the injection pressure. In addition, if the swelling is too great difficulties appear when the counter-mould is installed, and when the mould is closed.

It should be noted that such a casing can have a very large diameter, for example of the order of 2 m. Consequently, the mould and the counter-mould are of substantial size and mass; handling of them is therefore laborious.

It is, consequently, one aim of the present invention to provide a device for manufacturing parts made of composite material, particularly turbomachine casings, enabling parts to be obtained with very great dimensional precision, whilst being relatively "lightweight" and easy to handle.

Another aim of the present invention is to provide a method of manufacture of parts made of composite material which is relatively simple to implement, and which enables parts with the desired dimensions to be obtained.

DESCRIPTION OF THE INVENTION

The aims set out above are attained by means of a manufacturing device comprising a rigid mould and rigid counter-mould, where the material forming the internal mould has a much higher expansion coefficient than the material which at least partly forms the counter-mould, and means of injecting a resin between the mould and the counter-mould at a relatively low pressure of less than 4 bar.

The expansion difference between the mould and the counter-mould resulting from this during manufacture of the part, which is undertaken at high temperature, causes the preform which has been previously impregnated at low temperature to be compacted, guaranteeing the part's dimensional precision. In addition, the device, in particular the counter-mould, may be of a lighter weight structure, since the injection pressure is low. Furthermore the mould, when cold, has internal dimensions which are greater than the final dimensions sought for the object; the installation of the counter-mould on the mould is facilitated despite the swelling.

The counter-mould is made, for example, of a composite material. It thus expands very little at high temperature. In addition, it is relatively lightweight and therefore more easily handled.

Due to the invention the device can be relatively lightweight due to the relatively low injection pressure. However, the device enables the resin to be injected under pressure. The vacuum pressure generated in the space between the mould and the counter-mould ensures that the preform is satisfactorily wetted.

If the counter-mould has flanges for attachment to the mould, these flanges are advantageously made of a material with an expansion coefficient close or equal to that of the material of the mould.

The subject-matter of the present invention is then mainly a device for manufacturing parts made of a composite material from a preform made of woven fibres, comprising a rigid mould and a counter-mould delimiting a space intended to receive a preform made of woven fibres, where the mould is made of a material with an expansion coefficient appreciably higher than that of the counter-mould, and where said device also comprises means of pressurised injection of a resin into said space.

In a particularly advantageous manner, the counter-mould is made of a composite material. The mould is then preferentially made of steel or of an aluminium alloy.

The device according to the invention can advantageously comprise means able to generate a vacuum pressure in the space delimited by the mould and the counter-mould.

The device according to the present invention enables parts with a rotational shape to be manufactured, such as a fan casing of a turbomachine; to this end the mould comprises a cylindrical body with a lengthways axis and side flanges. The counter-mould comprises a cylindrical body and side counter-flanges, where the counter-flanges are intended to be attached securely to the flanges, and where the body of the mould and the body of the counter-mould are concentric. The preform is intended to be positioned between the body of the mould and the body of the counter-mould. The material of the body of the mould has an expansion coefficient which is appreciably higher than that of the body of the counter-mould.

In a preferred manner, the difference between the expansion coefficients of the mould and of the counter-mould is greater than or equal to $23.10^{-6}$. In a very advantageous manner, the device according to the invention comprises means to exert a clamping force along the lengthways axis on the counter-flanges towards the outside of the mould, and means to exert a radial clamping force on the counter-flanges aligned with the lengthways axis. The forces required to attach the counter-mould to the mould are then small, and the risks of deformation of the preform are also small.

The counter-flanges of the counter-mould and the flanges of the mould preferably have similar or equal expansion coefficients.

Advantageously, the sides of the body of the counter-mould in contact with the counter-flanges are inclined relative to the lengthways axis.

The counter-flanges can be made of several portions; the mating surface between two portions of a counter-flange is preferably inclined relative to the lengthways axis, enabling the damage to the seals between the portions of counter-flange to be limited.

Another subject-matter of the present invention is a method to manufacture a turbomachine casing using the manufacturing device according to the present invention, comprising the steps of:

a) manufacture of a preform made of woven fibres,
b) installation of the preform on the mould,
c) installation of the counter-mould on the preform,
d) application of the clamping forces,
e) injection of the resin under pressure and heating of the device,
f) polymerisation of said resin,
g) removal of the counter-mould and the mould.

During step d) the forces applied are both axial forces on to the counter-flanges along the lengthways axis towards the outside, and radial forces on to the counter-flanges towards the inside.

After polymerisation, the clamping forces are slackened, and the counter-mould and mould are left in position.

BRIEF DESCRIPTION OF THE ILLUSTRATIONS

Figure 2:
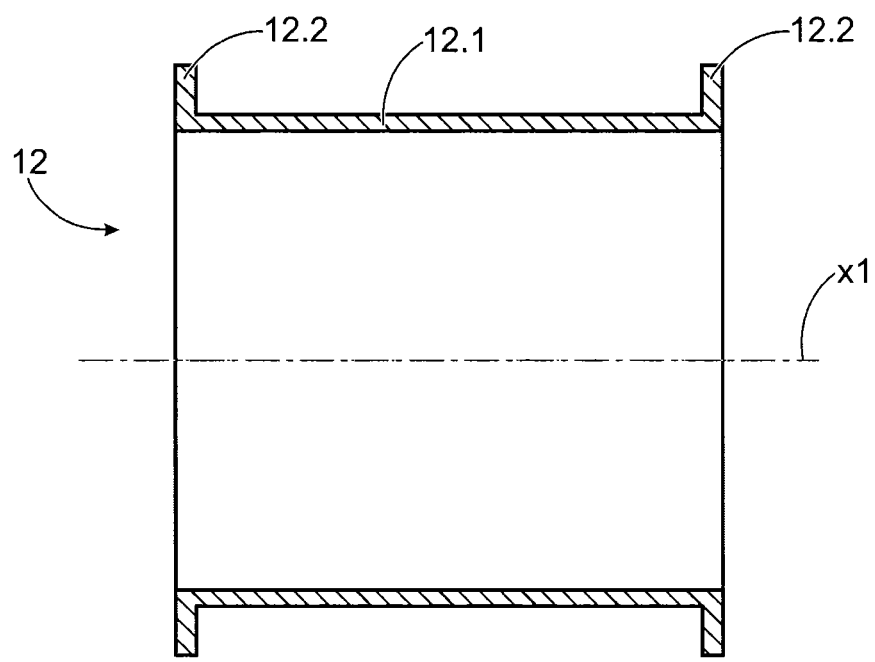
Figure 3:
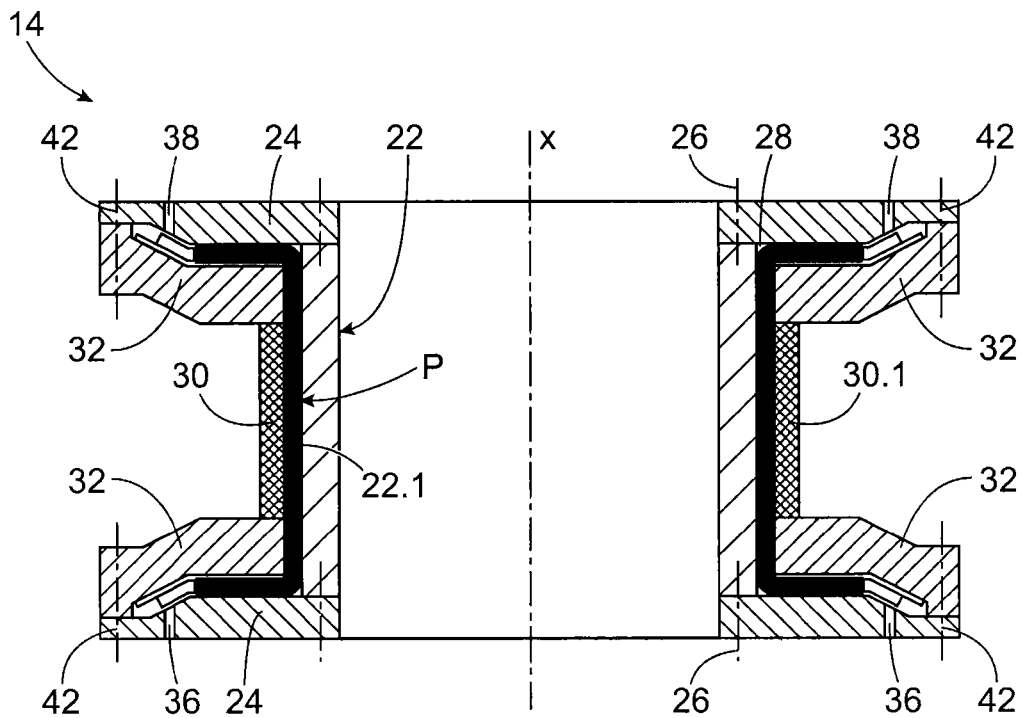
Figure 4:
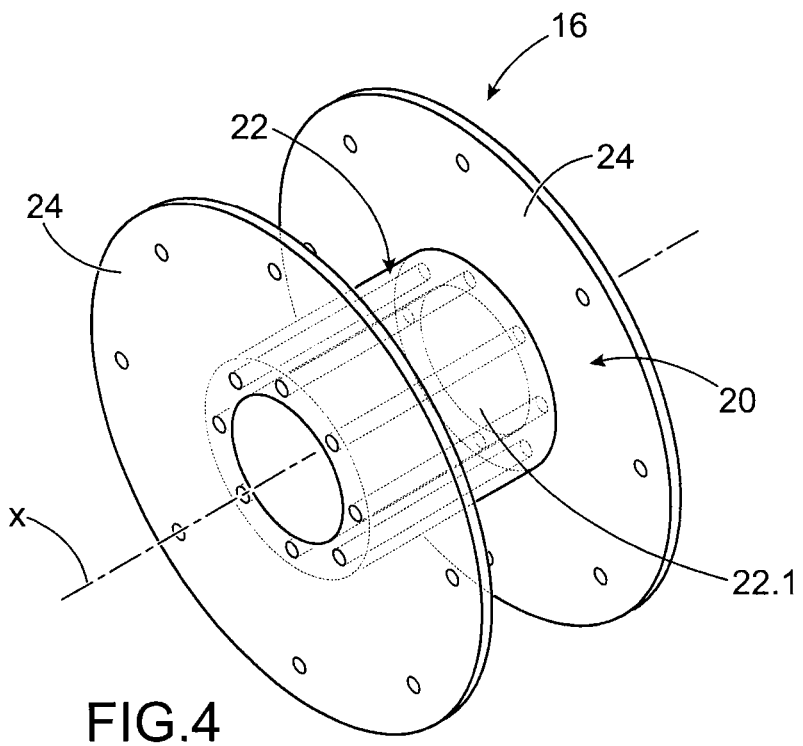
Figure 5:
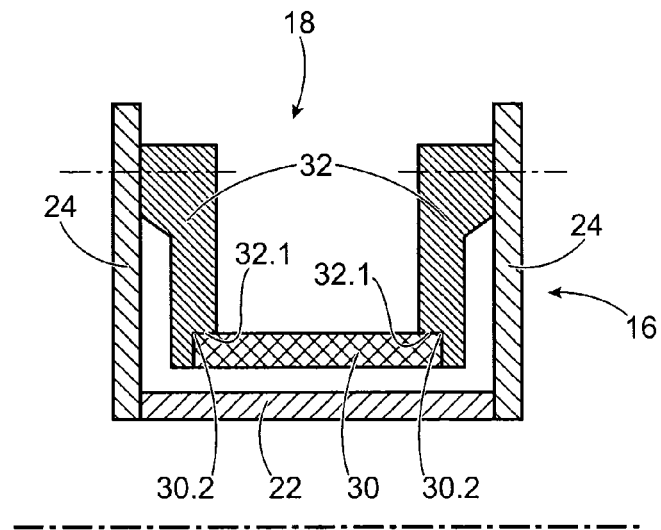
Figure 6:
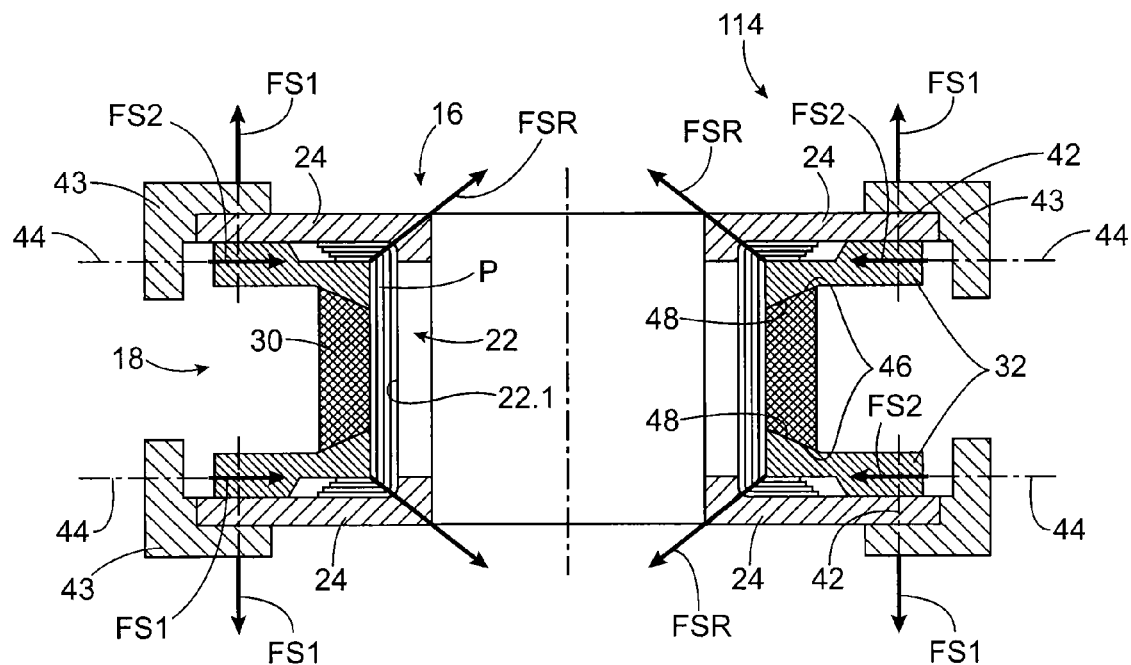
Figure 7:
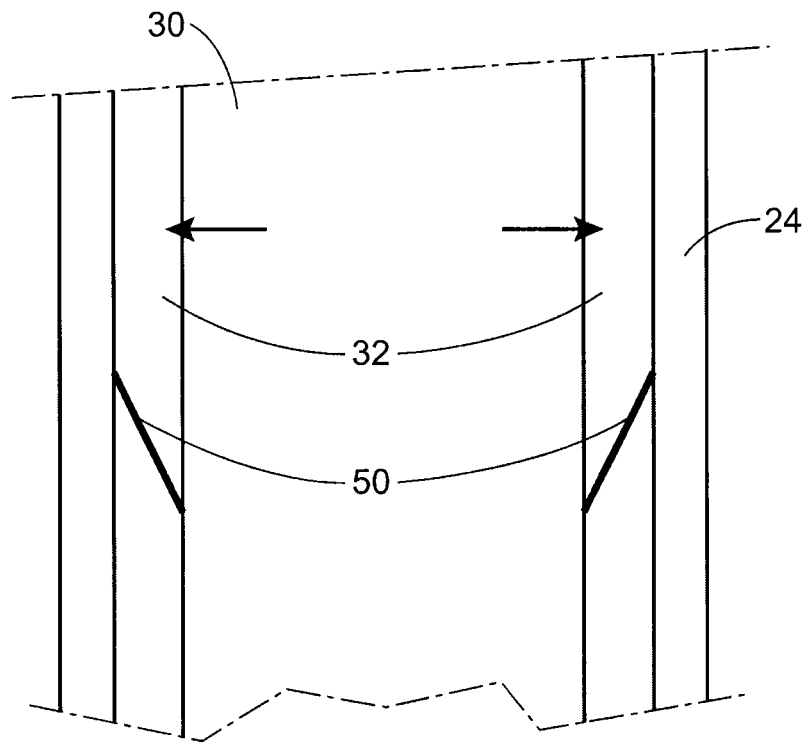
Figure 8:
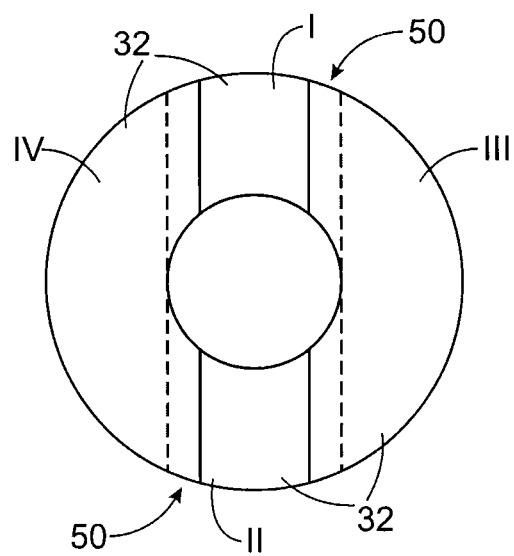

The present invention will be better understood using the description which follows and the appended illustrations, in which:

FIG. 1 is an overall view of a turbojet the fan casing of which can be manufactured by means of the device and the method according to the present invention, FIG. 2 is a section view of the fan casing which can be manufactured using the device and the method according to the present invention, FIG. 3 is a section view of an example embodiment of a manufacturing device according to the present invention, FIG. 4 is a perspective view of the mould of a manufacturing device according to the present invention, FIG. 5 is a lengthways section view of a variant embodiment of the device of FIG. 3, FIG. 6 is a section view of an advantageous example embodiment of manufacturing device according to the present invention, FIG. 7 is a top view of the device of FIG. 6 showing the mating surfaces between the counter-flanges of the counter-mould, FIG. 8 is a diagrammatic representation of an example assembly of counter-flanges corresponding to FIG. 7.

DETAILED ACCOUNT OF PARTICULAR EMBODIMENTS

The invention will be described below in the context of its application to the manufacture of a fan casing of a turbojet. However, the present invention may be applied to the manufacture of any object made of a composite material having a rotational axis, and more generally to any object made of a composite material.

In FIG. 1 a turbojet of axis X1 can be seen fitted with a fan casing according to the present invention. This casing comprises, moving from upstream to downstream in the direction of flow of gaseous streams, a fan 2 positioned at the inlet of the engine, a compressor 4, a combustion chamber 6, a high-pressure turbine 8 and a low-pressure turbine 10.

The turbojet is housed within a casing comprising several portions which are different elements of the turbojet. Fan 2 is thus surrounded by a fan casing 12.

In FIG. 2 a section view can be seen of fan casing 12 of axis X1 formed from a cylindrical body 12.1 and from flanges positioned at the longitudinal ends 12.2 of cylindrical body 12.1.

In FIG. 3, an example embodiment of a device 14 for manufacturing a casing made of a composite material can be seen according to the present invention implemented using the injection method according to the present invention. The casing is manufactured from a preform P produced by weaving fibres.

Device 14 has a general rotational profile around an axis X. The device comprises a mould 16 and a counter-mould 18.

Mould 16, which is represented in perspective in FIG. 4, is made of a material having a certain rigidity, such as for example a metal material, and having an expansion coefficient c1. Mould 16 is made, for example, of steel or an aluminium alloy.

The mould defines the internal shape of fan casing 12. As can be seen in the example represented in FIG. 4, the mould has the shape of a rim; it comprises an annular cavity 20 intended to accommodate preform P made of woven fibres. Annular cavity 20 is delimited between a cylindrical body 22 of axis X, having a circular section, and flanges 24 at each of the longitudinal ends of body 22. Cylindrical body 22 therefore comprises a radially external face 22.1 intended to come into contact with the interior of the casing when the injection and polymerisation are completed.

Cylindrical body 22 can be produced as a single piece. Each flange 24 can also be produced as a single piece, or as several angular portions.

Flanges 24 are attached to cylindrical body 22, for example by means of screws 26, represented symbolically by their axes, so as to produce a rigid assembly. These screws are distributed angularly over the entire periphery of the flanges.

Flanges 24 and body 22 can be made of the same material, or of materials having expansion coefficients of similar values.

Counter-mould 18 has an annular shape matching cavity 22 of the mould such that, when counter-mould 18 is positioned in mould 16, a space 28 is delimited for the manufacture of the casing. Space 28 is intended to accommodate the woven fibre preform and the resin.

Counter-mould 18 is intended to define the external shape of the casing. The latter also has the shape of a rim, with an annular body 30 of axis X and counter-flanges 32 at each of the longitudinal ends of body 30. Body 30 will be called the "external body", and body 22 will be called the "internal body".

External body 30 consists of at least two portions, and preferably three, in the shape of an arc of a circle, to allow it to be installed around the preform. The closure sequence will be accomplished in the order described in FIG. 8 (I, II, III, IV). Counter-flanges 32 are also made in several portions, at least two.

External body 30 therefore comprises a radially internal face 30.1 intended to come into contact with the radially external surface of the casing when the injection and polymerisation are completed.

In a preferred manner, in the case of the fan casing, the ridges of flanges 32.1, 32.2 positioned longitudinally outside define the radii between tubular body 12.1 and flanges 12.2 of the casing. This configuration facilitates the manufacture of the equipment, and also the mould release of the part. For example, the different portions of the external body are held in place by strapping.

According to the present invention, external body 30 is made of a material having an expansion coefficient c2 which is appreciably lower than that, c1, of internal body 22.

The difference between expansion coefficients c1 and c2 is preferentially of the order of $23.10^{-6}$ K$^{-1}$.

The expansion coefficient of the material constituting the mould is, for example, between $23.10^{-6}$ K$^{-1}$ and $12.10^{-6}$ K$^{-1}$, and the expansion coefficient of at least a portion of the counter-mould is, for example, between 0 and $23.10^{-6}$ K$^{-1}$.

External body 30 is advantageously made of a composite material, which has a very much lower expansion coefficient than that of steel or aluminium. Furthermore, composite materials expand only slightly; consequently their shapes and dimensions vary only slightly, or very slightly, when heated. The counter-mould made of composite material thus has the final dimensions desired for the object.

Conversely, mould 16, which expands substantially, has, when cold, i.e. at ambient temperature, internal dimensions which are less than the final external dimensions of the object and, when hot, i.e. at the injection temperature, internal dimensions equal to those expected for the object.

In the case of an internal body 22 made of aluminium, external body 30 may be made of steel.

Counter-flanges 32 are advantageously made of a material with an expansion coefficient close or equal to that of flanges 24. For example, counter-flanges 32 and flanges 24 are made of the same material. Indeed, since counter-flanges 32 are intended to be attached to flanges 24, it is then preferable for both these portions to have similar expansion properties.

The manufacturing device according to the invention also comprises means of injection of the resin under pressure into space 28. The mould is traversed by at least one channel 36 forming an injector emerging in space 28 and connected to a pressurised resin supply. Injection channel 36 is made in one of flanges 24. Advantageously, several injection channels 36 are distributed angularly throughout flange 24. The injection pressure is preferably less than 4 bar, for example of the order of 2 to 3 bar.

The other flange 24 is traversed by at least one ventilation channel 38, to allow the air contained in space 28 to be evacuated during injection. In addition it is possible with this ventilation channel to enable it to be detected when a sufficient quantity of resin has been injected, when resin escapes through this channel 38. Advantageously, several ventilation channels 38 are distributed angularly in other flange 24.

As a variant, the injection and ventilation channels can be made in the counter-mould.

Counter-flanges 32 of counter-mould 18 are attached to the flanges of the mould, for example by screws 42 represented symbolically by their axes parallel to axis X, where each screw passes all the way through a flange and the counter-flange opposite this flange. Screws 42 are advantageously in the form of swivel screws installed hinged on the flanges. Installation of the counter-mould is then simplified.

The different parts of the device delimit a space 28 which is appreciably sealed against the resin.

To this end, seals (not represented) are comprised between the different elements of the manufacturing device.

There are seals, for example O-rings, between internal body 22 and flanges 24. There are seals, for example O-rings, between external body 30 and counter-flanges 32. There are also seals between the different portions of flanges 24, between the different portions of counter-flanges 32, and between the different portions of external body 30. There are seals, for example O-rings, between counter-flanges 32 and flanges 24.

In a preferential manner, the seals between internal body 22 and flanges 24, and between external body 30 and counter-flanges 32 are positioned as close as possible to space 28, preventing the resin from penetrating excessively between the parts of the device.

The seals are made, for example, of silicone.

The manufacturing device according to the invention also advantageously comprises means to create a vacuum pressure in space 28. Ventilation channels 38 can then be used to produce the vacuum pressure in space 28. To this end, space 28 is also designed such that it is airtight.

For example, it can be decided to cover the interior of the counter-mould with a bladder in order to produce the seal between the counter-flanges and the internal body.

Producing a vacuum pressure in space 28 prior to the injection improves impregnation of the preform.

The level of vacuum pressure produced in space 28 is, for example, of the order of 1 Bar.

In FIG. 5 an advantageous variant embodiment of the assembly between external body 30 and counter-flanges 32 of counter-mould 18 can be seen. In this variant, each flange 32 comprises in its radially internal face a groove 32.1 formed in the internal ridge and accommodating a ridge 30.2 of external body 30. This assembly facilitates the production of the seal between flanges 32 and external body 30.

In FIG. 6 another particularly advantageous embodiment of a manufacturing device 114 according to the present invention can be seen, enabling the forces required to install the counter-mould on the mould to be reduced.

The references used to designate the elements of the device of FIG. 3 will be used to designate the elements of the device of FIG. 6.

Manufacturing device 114 of FIG. 6 differs from device 14 of FIG. 3 in that radial clamping means are added.

The device of FIG. 6 comprises a mould 16 of axis X and a counter-mould 18 concentric to mould 16.

Mould 16 comprises an internal body 22 and flanges 24 at its longitudinal ends. Counter-mould 18 comprises an external body 30 and counter-flanges 32.

In addition, device 114 according to figure comprises means to apply a longitudinal clamping force towards the outside of the device between each counter-flange 32 and associated flange 24. These means are, for example, screws 42 traversing counter-flanges 32 and flanges 24. The screws are advantageously of the swivel screw type installed hinged on the counter-flanges. Flanges 24 comprise notches in which the screws are positioned when the clamping is applied. A nut is screwed on to each screw opposite the counter-flange relative to the flange, and exerts a clamping force on the counter-flange towards the outside, as symbolised by the arrows designated FS1.

These clamping means are installed angularly over the entire periphery of the device.

The manufacturing device according to this advantageous example also comprises means to exert a radial clamping force on the counter-flanges in the direction of axis X. In the represented example, this radial force represented symbolically by arrows FS2 is exerted via stop blocks 43 added on to flanges 24 upstream from counter-flanges 32 in the direction of arrows FS2. Locking screws 44, represented symbolically by their axis, are installed in stop blocks 42 and press against counter-flanges 32 radially towards axis X.

Mechanical stops are advantageously installed to limit the radial and axial clamping forces.

In addition, sides 46 of external body 30 coming into contact with counter-flanges 32 are advantageously inclined relative to the radial direction towards the inside, advantageously at 45°. Sides 48 of the counter-flanges in contact with sides are also inclined in a similar manner. When the differential expansion occurs the inclined sides enable gaps to be controlled, in order to preserve the seal. Counter-mould 18 is then subjected to axial clamping forces FS1 and radial clamping forces FS2. The resulting clamping force FSR is then inclined towards the outside of the mould. The FSR forces are not represented to scale. The effect of this combination of axial and radial clamping forces is to compact effectively the flanges of the preform, and therefore to limit the forces required to install the counter-mould on the mould, in particular if there is substantial swelling of the preform.

In addition, as can be seen in FIG. 7, which represents a top view of a counter-mould according to the invention, mating surfaces 50 between two successive portions of the flanges of the counter-mould are preferably inclined relative to the axial clamping direction. Angle of inclination α is at least equal to 45°.

In FIG. 8 an example of portions I, II, III, IV forming counter-flanges 32 of the counter-mould of a manufacturing device according to the invention can be seen represented diagrammatically.

The mating surfaces between the portions forming external body 30 made of a composite material are, for example, straight.

This device is particularly useful in the case of preforms having swelling of greater than or equal to 20%.

We shall now describe a method of manufacture according to the present invention of a fan casing made of a composite material using the manufacturing device of FIG. 6.

At an earlier stage a preform P made of woven fibres is produced.

Preform P can be produced on a weaving loom, brought into the injection plant and positioned around mould 16. Preform P is, for example, made by three-dimensional weaving.

The fibres are, for example, carbon, glass or Kevlar® fibres, and the resin is, for example, an epoxy resin.

When the preform is installed on mould 16, counter-mould 18 is installed on mould 16 against the preform. To accomplish this, the different portions of counter-flanges 32 and of external body 30 are installed. A clamping force FS2 radially aligned towards the inside of mould 16 is exerted on counter-flanges 32 by means of screws 44, and an axial clamping force FS1 towards the outside is also exerted on counter-flanges 32 by means of swivel screws 42. It should be noted that there are no mechanical connections between the counter-flanges and the external body of counter-mould 30, to tolerate the expansion differences between the counter-flanges and the external body of counter-mould 30.

As previously mentioned, the mould when cold has internal dimensions which are smaller than the final dimensions of the casing. Installation of preform P in the mould, and closure of the mould with the counter-mould, are then made easier, even if there is substantial swelling of the preform.

By means of the device of FIG. 6, and of the combined application of axial and radial clamping forces, installing the counter-mould on the mould requires a small force, which reduces the risks of damaging the preform and the seals.

A vacuum pressure of the order of 1 Bar is then advantageously produced in space 28.

In a subsequent step, under a pressure of at most 4 Bar, the resin is injected into space 28 via the injection channels, and the air escapes simultaneously through the ventilation channels.

The resin then impregnates the preform. The impregnation is facilitated through the combination of a vacuum pressure and the injection pressure.

The injection is accomplished at a temperature of the order of 160° C.-180° C.

At this temperature the materials of internal body 22 and of external body 30 expand. And it is principally the body of the mould which expands, causing face 22.1 of internal body 22 to move radially towards the outside. Face 30.1 of the body of counter-mould 18 has a roughly unchanged radial position.

As it expands the mould roughly takes on the desired internal dimensions of the casing.

The differential expansion causes a compacting of the preform impregnated with non-polymerised resin i.e. of any folds which may have appeared when the preform was produced and installed in the mould.

Due to this compacting the dimensional precision of the parts is increased.

Due to the invention an automatic compacting of the preform can therefore be seen, before the polymerisation of the resin. It is then no longer necessary to undertake any compacting before installing the counter-mould.

By virtue of the invention parts may be produced with very great precision, with swelling which may be as high as 20%.

A step of polymerisation then occurs when the preform and the resin satisfy the expected dimensional conditions.

Whilst still hot the counter-mould is then unclamped from the mould in order to prevent stresses to the part.

After cooling the counter-mould and then the mould are removed. During cooling the mould returns to its initial dimensions; it then no longer applies any stresses to the cast part. Mould-release is then facilitated.

The part obtained in this manner forms a blank which will then generally be machined.

As an example, if the mould is made of aluminium alloy and external body 30 of the counter-mould is made of steel, for a part of diameter 2 m, for a temperature of 160° C., the expansion will be:

approximately 7.5 mm for the aluminium alloy mould, and approximately 3.75 mm for the steel counter-mould.

By virtue of the invention an additional compacting of approximately 3.75 mm is obtained.

The injection conditions relating to the manufacturing device according to the present invention allow faster impregnation of the preform. The cycle period is therefore small. Which is particularly useful, since the impregnation of the resin must occur relatively rapidly, over approximately 20 minutes.

The manufacturing device is easier to handle. Indeed, the different portions of the counter-mould can easily be installed and removed, particularly when a portion of the counter-mould is made of a composite material, and as a consequence of the separation between the counter-flanges and the external body. The installation and removal times are therefore short, reducing further the cycle period.

The manufacturing device according to the present invention applies to the manufacture of all parts made of composite material, whether or not they have a rotational axis.

Furthermore, it is particularly suitable for the production of large-size axisymmetric parts.

The described clamping and attachment means are in no sense restrictive, and all other means available to the skilled man in the art are applicable.

Furthermore, the structure of the manufacturing device of FIGS. 3, 5 and 6 is suitable for the manufacture of a fan casing fitted with flanges; however, this casing can be modified to manufacture, for example, a casing without flanges.

The device according to the invention is also suitable for manufacturing parts, of the bodywork elements type, and also covers. In this case, the base of the mould is shaped to match the shape of the part to be manufactured, and the counter-mould is applied on top of the preform.

The invention claimed is:

1. A device for manufacturing parts with a rotational shape or a fan casing of a turbomachine made of composite material from a preform made of woven fibers, comprising:
   a rigid mold configured to contain the preform, the mold including a cylindrical body of lengthways axis and side flanges;
   a counter-mold including a cylindrical body and side counter-flanges, the counter-flanges being configured to be attached to the side flanges of the mold, the cylindrical body of the mold and the cylindrical body of the counter-mold being concentric, the preform being intended to be positioned in a space delimited by the cylindrical body of the mold and the cylindrical body of the counter-mold, a material of the cylindrical body of the mold having an appreciably higher thermal expansion coefficient than a thermal expansion coefficient of a material of the cylindrical body of the counter-mold;
   a device for injection under pressure of a resin into the space, the injection pressure being less than 4 Bar; and
   a device configured to produce a vacuum pressure in the space delimited by the mold and the counter-mold,
   wherein the counter-flanges and the flanges have substantially equal thermal expansion coefficients.

2. A manufacturing device according to claim 1, in which a difference between the expansion coefficients of the mold and the counter-mold is less than or equal to $23.10^{-6}$ $K^{-1}$.

3. A manufacturing device according to claim 1, in which the counter-mold is made of a composite material.

4. A manufacturing device according to claim 1, in which the mold is made of steel or an aluminum alloy.

5. A manufacturing device according to claim 1, further comprising a first clamping device for exerting a clamping force along a lengthways axis on the counter-flanges towards an outside of the device, and a second clamping device for exerting a radial clamping force on the counter-flanges aligned with the lengthways axis.

6. A manufacturing device according to claim 5, wherein the first clamping device includes screws which traverse the side flanges and the side counter-flanges.

7. A manufacturing device according to claim 5, wherein the second clamping device includes stop blocks provided on the stop flanges and locking screws which are installed in the stop blocks and press against the side counter-flanges radially towards the lengthways axis.

8. A manufacturing device according to claim 1, in which the sides of the body of the counter-mold in contact with the counter-flanges are inclined relative to the lengthways axis.

9. A manufacturing device according to claim 1, in which the counter-flanges are in plural portions, a mating surface between two portions of a counter-flange being inclined relative to the lengthways axis.

10. A method of manufacture of a turbomachine casing through use of a manufacturing device including a rigid mold configured to contain a preform made of woven fibers, the mold including a cylindrical body of lengthways axis and side flanges, a counter-mold including a cylindrical body and side counter-flanges, the counter-flanges being configured to be attached to the side flanges of the mold, the cylindrical body of the mold and the cylindrical body of the counter-mold being concentric, the preform being intended to be positioned in a space delimited by the cylindrical body of the mold and the cylindrical body of the preform, a material of the cylindrical body of the mold having an appreciably higher thermal expansion coefficient than a thermal expansion coefficient of a material of the cylindrical body of the counter-mold, a device for injection under pressure a resin into the space, the injection pressure being less than 4 Bar, and a device configured to produce a vacuum pressure in the space delimited by the mold and the counter-mold, the method comprising:
   a) manufacturing the preform made of woven fibers;
   b) installing the preform on the mold;
   c) installing the counter-mold on the preform;
   d) producing a vacuum pressure in the space between the mold and the counter-mold;
   e) injecting the resin under a pressure of less than 4 bar;
   f) heating the device;
   g) polymerisation of the resin; and
   h) removing the counter-mold and the mold,
   wherein the counter-flanges and the flanges have substantially equal thermal expansion coefficients.

11. A method of manufacture according to claim 10, in which the manufacturing a) and the installing b) are simultaneous, the preform being produced directly on the mold.

12. A method of manufacture according to claim 10, the method further comprising:
   after the c) installing the counter-mold on the preform, applying clamping forces between the mold and the counter-mold.

13. A method of manufacture according to claim 12, in which the clamping forces comprise axial forces on the counter-flanges along the lengthways axis towards an outside, and radial forces on the counter-flanges towards an inside.

14. A method of manufacture according to claim 12, in which, after the polymerisation, the clamping forces are slackened, and the counter-mold and the mold are left in position.

* * * * *